United States Patent [19]
Eckenrode et al.

[11] Patent Number: 5,363,379
[45] Date of Patent: Nov. 8, 1994

[54] FDDI NETWORK TEST ADAPTOR ERROR INJECTION CIRCUIT

[75] Inventors: Thomas Eckenrode, Endicott, N.Y.; David R. Stauffer, League City; Rebecca Stempski, Houston, both of Tex.

[73] Assignee: International Business Machines Corporation, Armonk, N.Y.

[21] Appl. No.: 876,835

[22] Filed: Apr. 30, 1992

[51] Int. Cl.⁵ .............................................. G06F 11/00
[52] U.S. Cl. ...................................................... 371/3
[58] Field of Search ............... 371/3, 2.1, 48; 370/60, 370/85.1

[56] References Cited

U.S. PATENT DOCUMENTS

| | | | |
|---|---|---|---|
| 4,491,945 | 1/1985 | Turner | 370/60 |
| 4,858,232 | 8/1989 | Diaz et al. | 370/86 |
| 4,866,704 | 9/1989 | Bergman | 370/85.4 |
| 4,979,167 | 12/1990 | McCool | 370/85.4 |
| 5,121,396 | 6/1992 | Irvin et al. | 371/53 |
| 5,168,496 | 12/1992 | Ohba et al. | 370/85.14 |
| 5,233,603 | 8/1993 | Takeuchi et al. | 370/60 |

FOREIGN PATENT DOCUMENTS

| | | | |
|---|---|---|---|
| 2005655 | 1/1990 | Japan | H04L 12/42 |
| 0413286 | 2/1991 | Japan | |
| 4074033 | 3/1992 | Japan | H04J 3/14 |

Primary Examiner—Robert W. Beausoliel, Jr.
Assistant Examiner—Norman M. Wright
Attorney, Agent, or Firm—Mark A. Wurm; Joseph C. Redmond, Jr.

[57] ABSTRACT

An apparatus for injecting errors into a FDDI token ring network is disclosed. The error injection scheme operates by fooling a FORMAC into thinking it sent a real frame of data. This is done by using two RAM buffers. The RAM buffer normally accessed by the RBC/DPC becomes a SHADOW RAM during error injection operation. A dummy frame is loaded into the shadow RAM in order to fool the FORMAC. This data is just like the data that would be used if sending a normal frame, with the restriction that it must be shorter than the error injection data. The other buffer, the error injection RAM, contains the error injection frame. The error injection data is sent out to the media by switching a multiplexor. When the FORMAC is done transmitting the data, the multiplexor is switched back to the normal mode. Thus, the FORMAC is unaware of what happened and the token ring remains operational.

2 Claims, 2 Drawing Sheets

FDDI NETWORK TEST ADAPTOR ERROR INJECTION CIRCUIT

The invention described herein was made in the performance of work under NASA Contract No. NAS9-18200 and is subject to the provisions of Section 305 of the National Aeronautics and Space Act of 1958 (42 U.S.C. 2457).

BACKGROUND INFORMATION

1. Field of the Invention

This invention relates to a circuit for injecting data containing error into an electronic circuit for which data containing errors may not normally be transmitted. In particular, an error injection circuit for testing a fiber optic distributed data interface (FDDI) network is described.

2. Background of the Invention

FDDI token ring networks are well known to those skilled in local area network technology. FDDI is a result of American National Standards Institute Committee X3T9. It supports a variety of networks configured in a variety of topologies and provides for secure transmission across long distance links.

The FDDI interface defined in X3T9.5 relates to the lower layers of the Open Systems Interconnection/International Organization for Standardization (OSI/ISO) model. Additional information on the ANSI X3T9.5 standard can be found in ISO 9314-2 (1989) "Fiber Distributed Data Interface (FDDI) Media Access Control (MAC)" and ISO 9314-1 (1989) "Fiber Distributed Data Interface (FDDI) Physical Layer Protocol (PHY)". Further information can be found in U.S. Pat. No. 4,979,167 and 4,890,304, both assigned to Advanced Micro Devices, Inc. These patents relate to specific implementations of FDDI networks.

As well known by those skilled in FDDI network technology, information to be transmitted over the FDDI network resides in a memory, or RAM buffer. When data is to sent out, a RAM buffer controller (RBC) and data path controller (DPC) work simultaneously to send the data to a fiber optic media access controller (FORMAC). The FORMAC sends the data to be transmitted to an Encoder/Decoder (ENDEC). The ENDEC then sends the data to the fiber optic transmitter.

The FORMAC performs media access control (MAC) layer protocol for the FDDI network. The FORMAC determines when a node can get access to the network and implements logic required for token handling and address recognition generation. The FORMAC controls the transmission of data by an internal transmit state machine that implements the FDDI MAC functions. Before the data is transferred, the FORMAC insures that the data (frame) to be sent corresponds to the FDDI standard for sending a frame. The standard states the maximum frame length, what information the frame should contain, and amount of preamble needed in front of the frame before a frame transmission can take place. The FORMAC can also generate FDDI command symbols. The FORMAC insures that only valid frames and symbols will be transmitted onto the optical media.

The FORMAC is also involved in the reception of data (frames). If the incoming frames contain errors, the FORMAC has the responsibility of detecting these errors and logging them so that the higher layers of software can tell if any errors occurred during frame transmission and reception.

Since the FORMAC is only able to send valid frames and symbols, a problem arises that it is impossible to verify that the receiving FORMAC and its supporting chips can detect and recover from errors. To verify correct operation of this logic, it is necessary to have some means of injecting data containing errors onto the fiber optic media. Existing devices to perform error injection functions are stand-alone devices and cannot operate as network node with a functional MAC layer.

OBJECTS OF THE INVENTION

It is the object of this invention to provide a circuit for injecting errors into a FDDI network.

It is also an object of this invention to provide a method for verifying the operation of an FDDI interface.

Is is another object of this invention to provide a circuit for injecting errors into a FDDI network which can also operate as a network node with fully functional MAC entity.

SUMMARY OF THE INVENTION

These objects, and other advantages to become apparent, are achieved by the error injection circuit (EIC) of this invention. The EIC is situated between the FORMAC and ENDEC logic, and allows the transmission of invalid frames of data, valid frames, and invalid/valid line state symbols streams onto a fiber optic bus. The EIC employs a shadow RAM concept to allow it to operationally coexist with the FORMAC, thereby providing a single test adapter design to meet the requirements of a wide range of FDDI hardware/software test environments.

The error injection scheme operates by fooling the FORMAC into thinking it sent a real frame of data. This is done by using two RAM buffers. The RAM buffer normally accessed by the RBC/DPC becomes a SHADOW RAM during error injection operation. A dummy frame is loaded into the shadow RAM in order to fool the FORMAC. This data is just like the data that would be used if sending a normal frame, with the restriction that it must be shorter than the error injection data. The other buffer, the error injection RAM, contains the error injection frame. The error injection data is sent out to the media by switching a multiplexor. When the FORMAC is done transmitting the data, the multiplexor is switched back to the normal mode. Thus, the FORMAC is unaware of what happened and the token ring remains operational.

DETAILED DESCRIPTION OF THE INVENTION

As commonly known in the art, the FORMAC controls the transmission of data by an internal transmit state machine that implements the FDDI MAC functions. Before the data is transferred, the FORMAC insures that the data (frame) to be sent corresponds to the FDDI standard for sending a frame. The standard states the maximum form length, the information the frame should contain, and the amount of preamble needed in front of the frame before frame transmission can take place. The FORMAC can also generate FDDI command symbols. The FORMAC insures that only valid frames and symbols will be transmitted on the optical media.

The FORMAC is also involved in the reception of data (frames). If the incoming frames contains errors the FORMAC has the responsibility of detecting these errors and logging them so that the higher layers of software can tell if any errors occurred during frame transmission and reception.

With the FORMAC only being able to send valid frames and symbols, it is impossible to verify that the receiving FORMAC and its supporting chips can detect and recover from errors.

Figure 1:
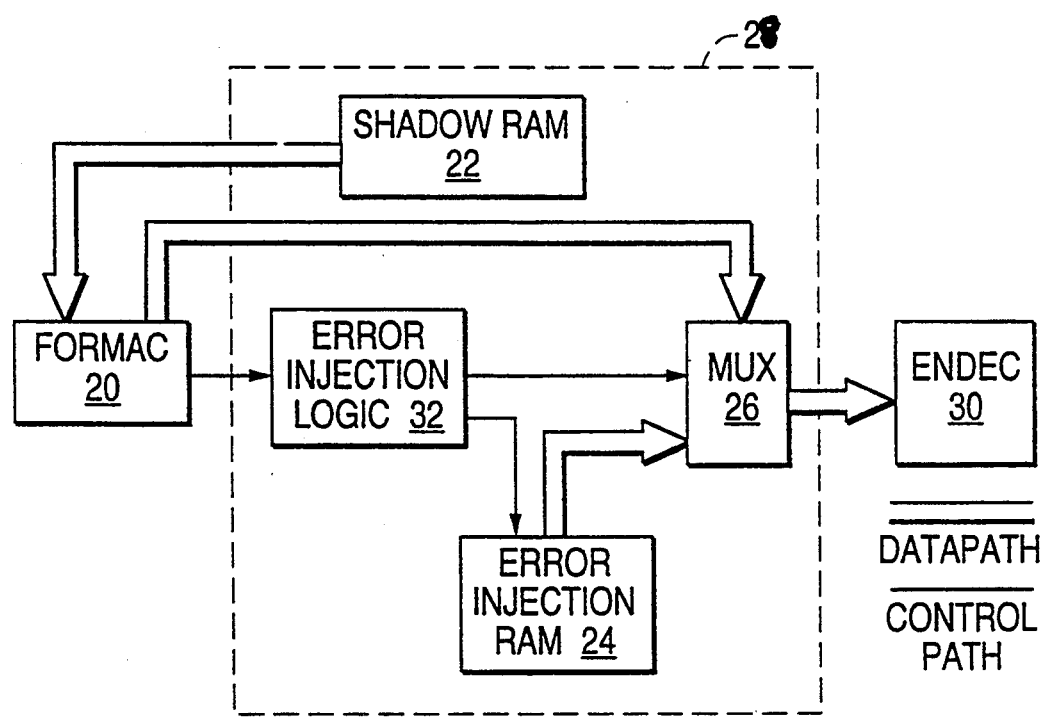
FIG. 1 is a high level block diagram of the error injection circuitry.

Referring to FIG. 1, the error injection scheme of this invention operates by fooling the FORMAC 20 into thinking it sent a real frame. This is done by using two RAM buffers. The RAM buffer normally accessed by the RBC/DPC becomes a SHADOW RAM 22 during error injection operation. A data frame containing dummy data in proper format is loaded into the SHADOW RAM 22 in order to fool the FORMAC. This data is similar to the data used if sending a normal frame, with the restriction that it must be shorter than the frame containing the error that is to be injected. The other buffer, the ERROR INJECTION RAM 24 (EIR), contains the error injection frame. It is important that the FORMAC 20 thinks it sent a correct frame so as to preserve normal token ring operation. The error injection data is sent out to the media by switching a multiplexor 26 (MUX). The MUX 26 is switched under hardware control. This takes place as soon as the FORMAC 20 informs the DPC to start sending data. As the data is being sent to the FORMAC from the DPC, the data from the EIR 24 is being sent out. The data from the SHADOW RAM 22 that the FORMAC 20 thinks it is sending is discarded. When the FORMAC 20 is done transmitting the data, the MUX 26 is switched back to the normal mode. Thus, the FORMAC 20 is unaware of what happened, and the token ring remains operational.

The Error Injection Circuit (EIC) 28 is located between the FORMAC 20 and ENDEC 30. When a FDDI card is in the error injection mode the data to be transmitted originates from the EIC 28. In normal transmission the data comes from the FORMAC 20. In order to provide this interface, the EIC 28 must monitor various status/handshake signals provided by the FORMAC and DPC, and must drive additional control bits to the EIR 24 and multiplexer (MUX) 26. The Error Injection Logic (EIL) 32 provides this capability, as further described below.

As stated previously, the FORMAC 20 manages the data flow in and out of the FDDI card. The FORMAC 20 informs the DPC when the transfer of data onto the media can start. For the transmission of data:

The DPC notifies the FORMAC 20 that it has data to be transmitted by asserting the Ready to Transfer Byte (RDYTBYT) line.

When the FORMAC 20 realizes that the DPC has data to transfer, it waits for a token. Upon the receipt of the token the FORMAC notifies the DPC to start sending the data by asserting the Transfer Byte (XFERBYTE) line.

When the DPC knows that XFERBYTE is active it starts sending the data to the FORMAC.

The FORMAC then sends the data to the ENDEC 30 which sends the data to a fiber optic transmitter (FIG. 1).

Figure 2:
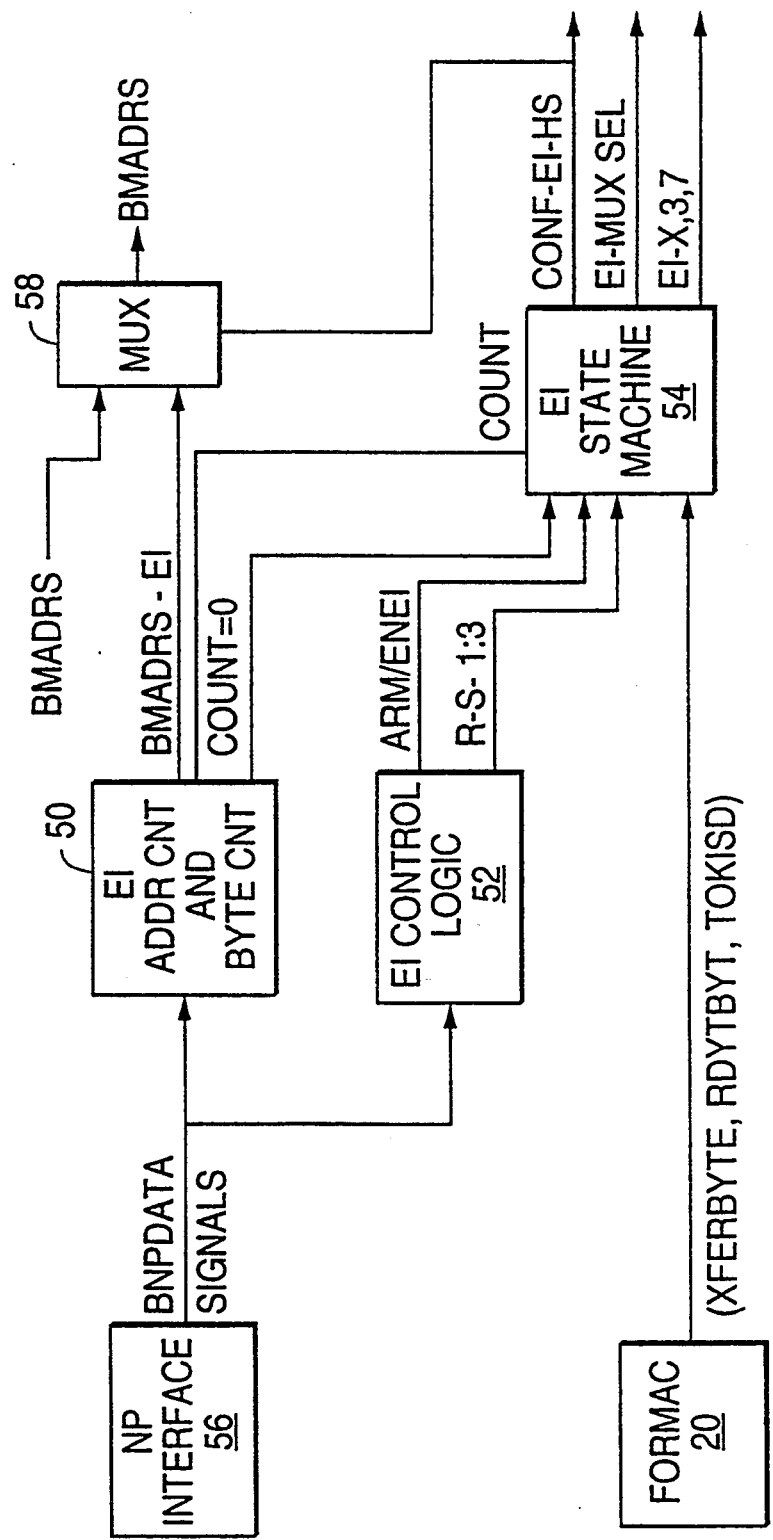
FIG. 2 is a block diagram of the error injection logic shown in FIG. 1.

The Error Injection Logic 32 uses the same signals to start the injection of errors onto the media. The EIL 32 is shown in FIG. 2. The EIL 32 includes of five functional components: EI Address Counter and Byte Counter 50, EI Control Logic 52, EI State Machine 54, Node Processor (NP) Interface 56, and a Multiplexer 58.

The EI Address Counter 52 and Byte Counter 50 controls the number of bytes to be injected onto the media. The EI control Logic 52 contains the logic necessary to trigger the error injection process. The logic controls the selection of the data MUX 26, the starting of the Address Counter 50 and the EI State Machine 54. The EI State Machine 54 performs two modes of error injection. One mode is frame status injection and the other is full error injection. Frame status injection changes the R/S status bits of the data stream being transmitted. Full error injection injects entire frame sequences. The EI State Machine 54 executes the following state sequences for the full error injection mode of operation:

| STATE | Description |
| --- | --- |
| #1: | Arm Error Injection hardware. The next available token will be captured by the FORMAC hardware, and error injection will be performed. |
| #2: | Wait for RDYTBYT and XFERBYTE to go active. When this happens the FORMAC 20 and DPC start the transfer of the SHADOW RAM 22 (FIG. 1). |
| #3: | Enable the Address Counter 50 and select the MUX 26. The address counter selects the address of the data to be transferred onto the media from the ERROR INJECTION RAM 24 (FIG. 1). Interjection of data continues until the EI Byte Counter 50 reaches its terminal value. |
| #4: | Check that the TOKISD signal from the FORMAC 20 is latched. This signal is used to inform EI hardware that the FORMAC 20 has completed transmission of the dummy data from the SHADOW RAM 22 (FIG. 1). The TOKISD signal must occur before the EI Byte Counter expires. |
| #5: | Reset EI Arm and TOKISD latch. |

TESTER ERROR INJECTION SCHEME

A typical error injection scheme occurs as follows:

Load the ERROR INJECTION RAM 24 with the data pattern to be transmitted. The first symbol pair must be preamble. The source of the data is irrelevant to the description of the invention. In this preferred embodiment. The data comes from an IBM PS/2 with MicroChannel bus which is connected to a token ring network. (IBM, PS/2 and MicroChannel are trademarks of International Business Machines Corporation)

A dummy frame is loaded into the SHADOW RAM 22 from the MicroChannel.

The Node Processor 56 sets up the EIC 28 for error injection operation by selecting buffer RAM error injection configuration, and by writing the EI Byte Count 50 with the number of bytes to be injected.

Arm the EIL 32. This is done via a Node Processor 56 write to a register in the EI Control Logic 52.

Queue the dummy frame in the SHADOW RAM 20 to the FORMAC 20 for transmission.

The next token will be captured by the FORMAC 20 in order to start the transmission of the dummy frame. The EIC will insert data from the ERROR INJECTION RAM 24 onto the fiber optic media in place of the dummy frame.

NODE PROCESSOR INTERFACE

The Node Processor Interface 56 provides access by a generic on-card processor bus to control EI functions and monitor EI status.

Node Processor Control

The NP Interface 56 includes access by a generic on-card processor bus to the following control register bits in the EI Control Logic 52:

| | |
|---|---|
| TESTENABLE bit | The TESTENABLE bit serves to enable/disable page error injection hardware. |
| CFG-EI-HS bit | The CFG-EI-HS bit selects buffer memory configuration. A zero (0) is for normal buffer memory configuration and a one (1) is for buffer memory partitioned for EI/HS. This bit is set to a 1 while error injection is in progress and to a 0 for loading the error injection buffer memory. |
| ARM-EI bit | The ARM-EI bit is set to arm error injection hardware. The next available token will be captured by FORMAC hardware, and error injection will be performed. Following completion of error injection, this bit is automatically reset. |
| R-S (3-bits) | The R-S bits are used for the frame status error injection scheme to transmit faulted symbols in the frame status field of the next transmit frame. |
| EI Count Register (16 bits) | The EI Count register in EI Address Counter and Byte Counter 50 contains the number of symbol pairs (bytes) to be injected onto the fiber optic bus. |

Node Processor Status

The Node Processor Interface 56 includes access by a generic on-card processor bus to the following status bits:

| STATUS FIELD | Description |
|---|---|
| ARM-EI status bit | The ARM-EI status bit is the read-back for the ARM-EI bit. |
| EI-ERROR bit | The EI-ERROR Status bit is set when the EI Byte Counter expires before the FORMAC releases the token during error injection activity. |

We claim:

1. Apparatus for injecting data frames containing errors onto a FDDI token ring network comprising:
   means for controlling fiber optic media access and performing validation of data frames to be transmitted over the FDDI network;
   logic means connected to the fiber optic media access controlling means;
   a first RAM buffer containing dummy data frames having valid formats;
   a second RAM buffer containing data frames having invalid formats; and
   means for multiplexing the data frames from the first and second RAM buffers, said multiplexing means having as inputs the two RAM buffers and the logic means, and providing as its output the data frames from one of the RAM buffers under control of said logic means,
   said logic means first initiating the transmission of data frames from the first RAM buffer and upon completion of the validation of the data frames, discarding the valid data frames and switching the multiplexing means to permit transmission of the invalid data frames from said second RAM buffer, whereby invalid data frames can be transmitted over the FDDI network to permit testing of the error correction capability FDDI network.

2. The apparatus as claimed in claim 1 wherein said logic means includes an error injection state machine, error injection control logic, and means for interfacing a computer node to the error injection control logic.

* * * * *